United States Patent [19]

Savage-Rumbaugh et al.

[11] Patent Number: 4,953,500
[45] Date of Patent: Sep. 4, 1990

[54] DOOR SYSTEM FOR LARGE PRIMATE CAGING

[75] Inventors: E. Sue Savage-Rumbaugh; Duane M. Rumbaugh, both of Ellenwood, Ga.; Samuel O. Smith, Apex, N.C.; Michael B. Smith, Lilburn, Ga.

[73] Assignee: Emory University, Atlanta, Ga.

[21] Appl. No.: 281,260

[22] Filed: Dec. 7, 1988

[51] Int. Cl.⁵ .......................... A01K 1/00; A01K 1/08
[52] U.S. Cl. ........................................ 119/17; 49/360
[58] Field of Search ..................... 119/15, 17, 19, 20; 49/360

[56] References Cited

U.S. PATENT DOCUMENTS

| | | | |
|---|---|---|---|
| 1,041,851 | 10/1912 | Niemann | 119/19 |
| 3,802,123 | 4/1974 | Frey et al. | 49/360 |
| 3,802,126 | 4/1974 | Markus | 49/360 |
| 3,821,865 | 7/1974 | Steinke | 49/360 |
| 3,921,335 | 11/1975 | Hewitt et al. | 49/360 |
| 3,938,282 | 2/1976 | Goyal | 49/360 |
| 4,296,570 | 10/1981 | Balbach et al. | 49/360 |
| 4,322,913 | 4/1982 | Himmer | 49/360 |
| 4,476,678 | 10/1984 | Hall | 49/360 |
| 4,794,879 | 1/1989 | Thom et al. | 119/17 |

Primary Examiner—Paul J. Hirsch
Attorney, Agent, or Firm—Needle & Rosenberg

[57] ABSTRACT

A door system for an opening separating two areas that contain a primate with the primate being able to control by switches connected to the operating system for opening and closing the door to dictate his ingress and egress between the areas. The caretaker can override the switches controlled by the primate. A hydraulically driven piston, operable through a fluid control cylinder containing a spool valve, raises and lowers the door to close and open the opening. Fluid exhausted from the system by the movements of the piston is discharged upon the floor of one of the areas to keep it clean.

3 Claims, 2 Drawing Sheets

DOOR SYSTEM FOR LARGE PRIMATE CAGING

The U.S. Government has rights in this invention pursuant to Grant No. HD-06016; RR-00165 from the National Institute of Child Health and Development.

BACKGROUND OF INVENTION

The present invention relates to a hydraulically actuated door apparatus, and more particularly to a door system for use in connection with cages housing large primates.

The typical enclosed environment for housing large primates or other subjects includes a first relatively large area for allowing the animal sufficient room to move about, and a second, smaller area, such as a cage, for providing more security and covering for the animal. A door has been traditionally used to separate the two environments.

It is advantageous to have a door which will extend to the primate an opportunity to travel freely between the two environments. It is also advantageous, for both security and for maintaining the environment inside the cage, to have a door which the primate can operate, and which can be opened by the animal and closed automatically. It is also important that there be an overriding control of the door by the caretaker.

In the past, such doors have been manually operated by the caretaker. This, however, is time consuming for the keeper. Electrically operated doors have also been used but these doors typically raise at uneven speeds and experience has shown that young primates often get their heads caught in the door. Also, the movement of the closing door should exert as little force as possible and should also be as quiet as possible. While these objectives may be accomplished with sophisticated electronics, too often this option is foreclosed to cost conscious research labs, zoos and municipalities.

Therefore, there exists a need for a door for use between two environments which is safe, effective, easy to maintain and inexpensive to both build and operate.

There exists a further need for such a door which is controllable by the subject and which has overriding control by a caretaker.

Partition opening and closing mechanisms that include hydraulic components are disclosed in Mercier, U.S. Pat. No. 2,741,477; Bruehler, U.S. Pat. No. 4,621,451; and Allenson, U.S. Pat. No. 1,542,205.

SUMMARY OF THE INVENTION

The present invention relates to a hydraulically actuated door apparatus which is used to provide controllable access by large primates and other subjects between two adjacent environments, such as cages.

The door is slidably mounted for vertical movement in an opening in a partition or wall between the two cages. A piston is connected to the door and is slidable within a hydraulic cylinder with fluid intake and exhaust means are thereon.

Also provided are means for controllably directing fluid to and from the hydraulic cylinder to raise and lower the slidable door comprising a control cylinder having a spool valve actuated by a solenoid. Fluid is selectably delivered through the control cylinder to and away from the hydraulic cylinder through the fluid intake and exhaust means to act upon the piston to raise or lower the door. Fluid expelled from the hydraulic cylinder due to the movement of the piston is directed onto the floor of one of the cages to help clean it.

Preferably, there is also provided two momentary contact door switches, one located in each environment separated by the door to allow the primate to operate the door. A master switch is provided outside the cage for allowing a caretaker to open and close the door without entering the cage. Once the primate operates a switch to open the door, a timing system causes the door to close after a predetermined amount of time. Also, a cut-off switch is provided for deactivating all the other switches and effectively locking the door.

The present invention allows the door to be quietly raised and lowered at minimum force without the need of expensive and complicated electronics. The door of the present invention is safe, effective, and easy to maintain. Also, it is controlled by the subject, yet has overriding control by a caretaker.

DETAILED DESCRIPTION OF THE PREFERRED EMBODIMENT

Figure 1:
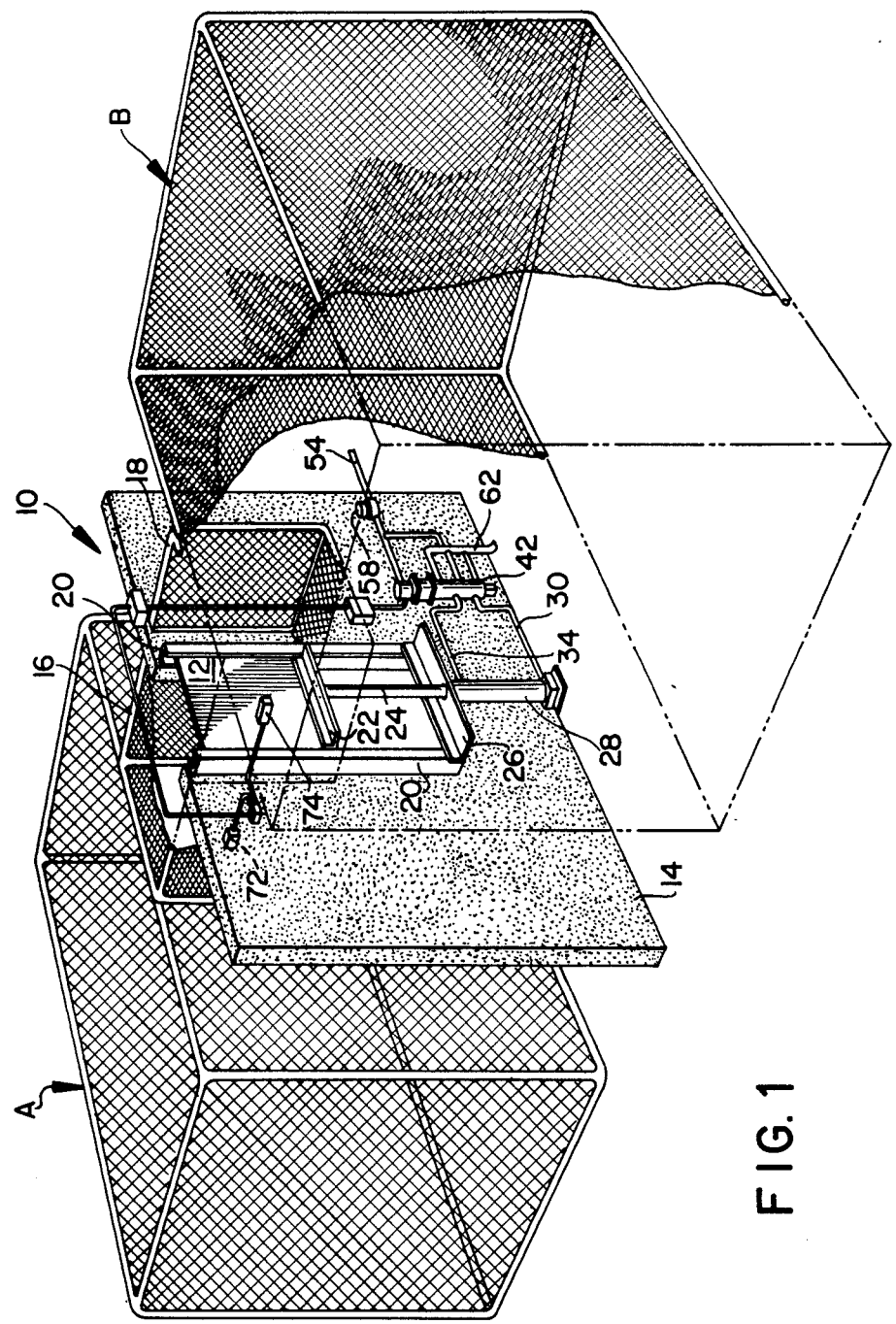
FIG. 1 is a perspective view of two cages incorporating the door of the present invention.

Referring to FIG. 1, the numeral 10 denotes overall the present invention which comprises a slidable door 12 which is operable between a closed position as shown and an open position (not illustrated) by means of a fluid-operated hydraulic cylinder assembly actuated by an electrical switching system. The door 12 in its closed position limits ingress and egress of primates between cages A and B through an opening (not illustrated) in wall 14. Cages for large primates are shown by way of example only and it should be appreciated that the present invention may be used to selectively limit access between any two areas. Each of the cages A, B includes a walkway 16, 18, respectively, that is elevated above the respective cages A, B and which communicates the interior of each cage with the opening. The walkways 16, 18 are sized for a primate's use.

The door 12 is slidable within a pair of vertical, spaced channel members 20 whose length is equal to twice the height of door 12. A L-shaped member 22 is affixed to the bottom of the door 12 and has connected to it the distal end of a piston 24 that is connected across the bottom ends of the channel members 20. The piston 24 extends from hydraulic cylinder 28 that is positioned below bracket 26 on the floor adjacent wall 14. The piston 24 is shown fully extended to maintain the door 12 in its first or closed position. When piston 24 is fully retracted, the door 12 will be in its second or open position, allowing a primate to move through the opening from one of the walkways 16, 18 and, hence to either cage A, B.

Figure 2:
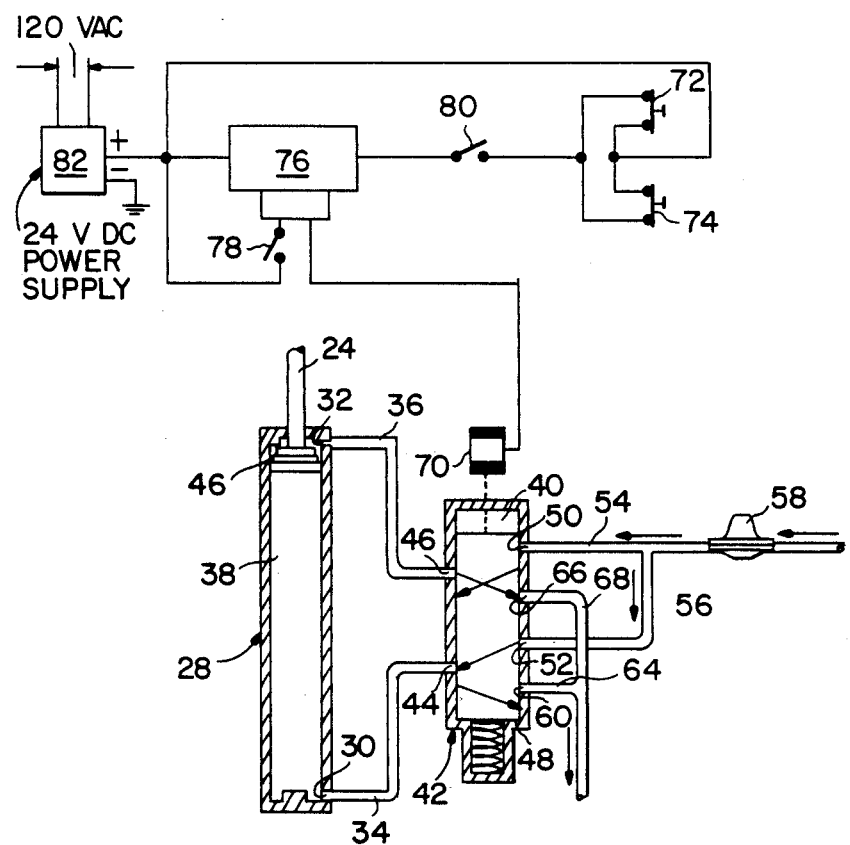
FIG. 2 is an electrical and fluid schematic of the door actuating mechanism of the present invention.

Referring to FIG. 2, the cylinder 28 has a port 30 located at its bottom portion and a port 32 positioned near its tope. Fluid conduits 34, 36, respectively, communicate the interior 38 of cylinder 28 with the interior 40 of a fluid control means, namely, control cylinder 42 through ports 44, 46, respectively. The control cylinder is a means for controllably directing fluid to and from the cylinder 28 in order to raise and lower the piston 24. As seen in FIG. 2, the upward limit of the path of travel of the piston 24 is controlled by shoulder 44 on the reduced diameter portion of the cylinder interior 38 which contacts circular flange 46 on the bottom of the piston 24. Port 32 is located above plate 46. Ports 30, 32 function as a selective fluid exhaust means or a fluid intake means, depending upon whether the piston 24 is to be raised or lowered, as described hereinbelow.

Spool valve 48 within the interior 40 of the control cylinder 42 receives fluid through ports 50, 52 which are connected, respectively, to fluid conduits 54, 56. Conduit 56 is in communication with a source of fluid (not shown) and has a fluid regulator 58 thereon. The regulator 58 controls fluid pressure in control cylinder 48 and hydraulic cylinder 28, thereby regulating the rate which door 12 is raised or lowered. The spool valve 48 directs fluid to and from the hydraulic cylinder 28 in order to raise and lower the piston 24. As depicted in FIG. 2, the valve 48 is positioned to allow fluid to flow through conduit 54, conduit 56, through port 52, out of port 44, along conduit 34, through port 30 and into the interior 38 of cylinder 28 to act upon the bottom of flange 46 to extend the piston 24 to the position as shown to close the opening between cages A, B.

When it is desired to lower the door 12, the valve 48 is moved to its other position (not shown) in control cylinder 42, thereby closing off ports 44, 52 and opening up ports 46, 50. That allows the fluid to move along conduit 54, into control cylinder 42, out of port 46, through conduit 36 and into the reduced diameter portion of the cylinder 28 through port 32. The fluid then acts upon the bottom of flange 46 to slowly move the piston 24 downward, opening the door 12.

As the fluid enters through port 32, the fluid beneath the flange 46 begins to exit the cylinder 28 through port 32, passes through conduit 34 into control cylinder 42 by means of port 44, exits the cylinder 42 through port 60 and enters exhaust conduit 62 along lower branch conduit 64. The exhaust conduit 62 is open to the atmosphere so that the fluid that is expelled from cylinder 28 is ultimately discharged onto the floor of cage B to cleanse it of any debris.

When the piston 24 is raised to the position as shown in FIG. 2, the excess fluid in cylinder 28 above the flange 46 is exhausted from the cylinder 28 through port 32 whereby it travels along conduit 36 into port 46, out of the control cylinder 48 through port 66 and into the exhaust conduit 62 through upper branch conduit 68.

The spool valve 48 is moved between its two positions to lower or raise the door 12 by means of actuation of solenoid 70 that is located on control cylinder 42. The control circuit for the solenoid 70 is shown schematically in FIG. 2 and includes two momentary, first and second contact door switches 72 and 74, that are preferably located upon either side of slidable door 12 and within each of the two cages A and B so that they are operable by the primate. Switches 72, 74 are electrically connected to a timing system 76, master switch 78, cut-off switch 80 and an electrical power source 82, all of which may be located outside of cages A and B.

With cut-off switch 80 in its normally closed position (not shown), engagement of either of switches 72 or 74 by a primate signals timing system 76 to actuate solenoid 70, engaging hydraulic assembly 28 to open sliding door 12. After a specified time duration, timing system 76 deactivates solenoid 70, thereby directing hydraulic assembly 28 through control cylinder 42 to close door 12. Such deactivation of solenoid 70 opens cut-off switch 80 to bypass the electrical connection between door switches 72, 74 and timing system 76, thus deactivating the operation of both door switches 72, 74. In that manner, the primate cannot control the position of the door 12 by means of those switches 72, 74.

Manual movement by the caretaker of the switch arm of master switch 78 to a "closed" position electrically closes the normally open switch contacts, actuating the electrical relay contained within timing system 76. This bypasses timing system 76 to actuate solenoid 70 to move spool valve 48 to its other position so that door 12 is eventually opened. By-pass of the timing system 76 defeats the automatic closing of sliding door 12.

Manual movement of the switch arm of master switch 78 to an "open" position as shown deactivates the electrical relay contained within timing system 76 and electrically reconnects timing system 76 to solenoid 70. This, in turn, engages piston 24 to close sliding door 12.

What is claimed is:

1. A primate door system for an opening separating two areas comprising:
   (a) a door movable between a first position to close said opening and a second position to open said opening;
   (b) a piston having a distal end that is connected to said door;
   (c) a hydraulic cylinder having said piston slidable therein;
   (d) a source of fluid;
   (e) a control cylinder located between and in fluid communication with said hydraulic cylinder and said source of fluid, wherein said control cylinder comprises a spool valve in said control cylinder that is connected to said electrical switching system; and
   (f) an electrical switching system connected to said control cylinder to selectably direct fluid into and out of said hydraulic cylinder to act upon said piston so as to move said door between said first and second positions, wherein said electrical switching system comprises a solenoid electrically connected to said spool valve; at least two electrical door switches, at least one of said switches being located in each one of said areas, said door switches operable by said primate and being connected to said solenoid; a timer and relay system in line with said solenoid and said door switches; a master switch in line with said door switches and said timer and relay system, a cut-off switch located between said door switches and said timer and relay system, said cut-off switch operable by the caretaker for said primate to render selectively inoperable said door switches and a source of electrical current operably connected to said solenoid, said door switches, said master switch, said timer and relay system and said cut-off switch.

2. A primate door system as claimed in claim 1 and further comprising an exhaust conduit in flow communication at one of its ends with said spool valve and being open to the atmosphere at its other end to discharge fluid into a selected one of said areas in order to clean said area, the fluid being discharged coming from said hydraulic cylinder as said door moves between said first and second positions.

3. A door system for large primate caging, comprising:
   (a) two primate cages;
   (b) a partition separating said cages;
   (c) an opening defined in said partition which allows movement of said primate between said cages;

(d) a door movable between a first position wherein said door closes said opening and second position wherein said opening is open;
(e) means for moving hydraulically said door between said first and second positions;
(f) means for controlling said hydraulic moving means, comprising a first switch located in one of said cages and a second switch located in the other of said cages, said switches being operable by said primate, fluid control means connected to said switches and said moving means to control the flow of fluid to said moving means and timer means electrically connected to said switches and said fluid control means whereby after said primate activates one of said switches to open said door so that said primate may move from one of said cages to the other, said timer means, after a predetermined amount of time, actuates said fluid control means to cause said door to close.

* * * * *